Patented June 2, 1931

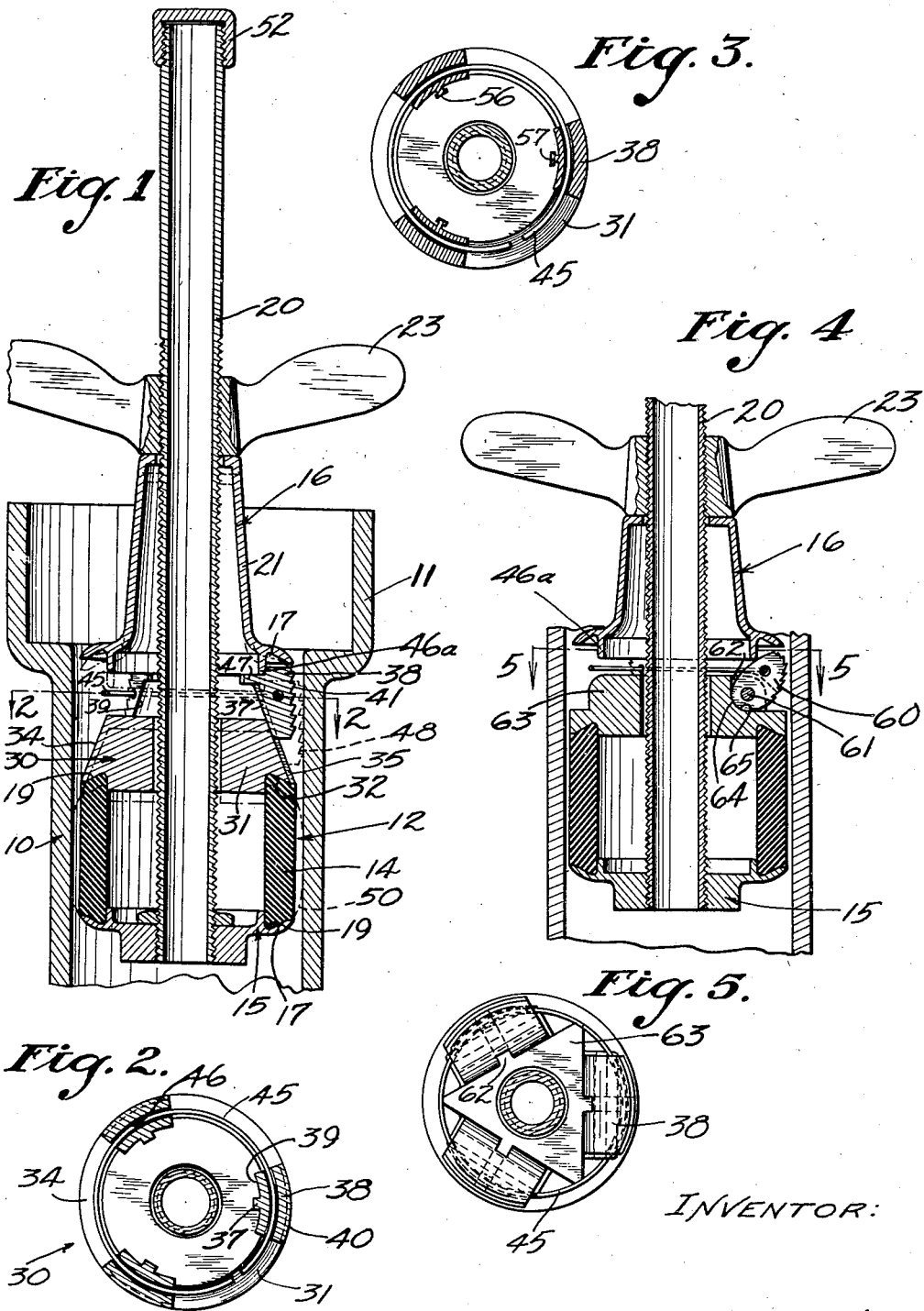

1,808,411

UNITED STATES PATENT OFFICE

DONALD R. HINKSTON, OF SOUTH PASADENA, CALIFORNIA

PIPE PLUG

Application filed May 14, 1928. Serial No. 277,454.

My invention relates to plugging devices, and more particularly to a novel form of pipe plug such as is used by plumbers in testing pipe and pipe joints.

In the plumbing art it is customary to install pipe for certain uses such as sewer pipe, stand pipe, etc. This pipe is formed by assembling sections of pipe, each section having an enlarged hub portion at one end adapted to receive an end of the adjacent section, this end being suitably packed in place by packing inserted between the end and the inner walls of the hub portion.

To test the pipe and the effectiveness of this packing, it is necessary to place a high fluid pressure in the pipe, and it becomes imperative that all outlet openings in the pipe be effectively plugged, these outlet openings being for the purpose of subsequently being connected to plumbing fixtures. In structures having pipes several stories in height the problem of effectively plugging the outlets becomes difficult, inasmuch as the head of fluid above the lower outlets becomes very large when the pipe is filled with this fluid.

It is an object of my invention to provide a pipe plug which is effective in sealing a pipe containing a fluid under very high pressure.

The present type of plugs used by plumbers for plugging these outlets comprises a flexible member which is longitudinally compressible to cause a transverse elongation thereof, this transverse elongation being sufficient to cause the flexible member to engage the walls of the pipe in sealing relationship. Such a plug is, however, not able to withstand the thrust exerted thereon by the high fluid pressure in the pipe, and it has heretofore been necessary to wire, tie, or otherwise secure these plugs in place during the testing of the pipe.

I have invented a novel clamping device for use on pipe plugs at present in use, this device comprising jaws which are drawn into clamping engagement with the pipe simultaneously with the sealing member being drawn into engagement with the walls of the pipe.

It is an object of my invention to provide auxiliary clamping means incorporated in a pipe sealing device for holding this device in place when the sealing member of the device is in fluid-tight engagement with the walls of the pipe.

A further object of my invention is to provide jaw means which are drawn into clamping engagement with the walls of a pipe simultaneously with the engagement of a sealing member with these walls.

Still a further object of my invention is to provide a positive clamping device incorporated in a pipe plug with a sealing member, the sealing member engaging the walls of a pipe with a force proportional to the engaging force between the clamping device and these walls.

A further object of my invention is to provide a clamping device which may be attached to pipe plugging devices at present widely in use.

Further objects and advantages of my invention will be made evident hereinafter.

Referring to the drawings in which I illustrate a preferred form of my invention, together with certain modifications thereof:

Fig. 1 is a vertical sectional view of the assembled pipe plug of my invention in disengaged position.

Fig. 2 is a cross sectional view taken on the line 2—2 of Fig. 1.

Fig. 3 is a cross sectional view similar to Fig. 2 of an alternate form of my invention.

Fig. 4 is a vertical sectional view of another alternative form of my invention.

Fig. 5 is a sectional view taken on the line 5—5 of Fig. 4.

Referring to Figs. 1 and 2, I illustrate one end of a pipe 10 having a hub 11 formed thereon. Adapted to securely plug the end of this pipe is a pipe plug 12 incorporating the features of my invention.

One well known type of pipe plug at present in wide use comprises a flexible annular sealing member 14 which is longitudinally compressible between a retaining member 15 and a cap member 16. Formed respectively in the upper and lower faces of the retaining and cap members 15 and 16 are grooves 17 which are annular in shape and complementary to an angled edge 19 at each end of the sealing member 14.

The normal outer diameter of the sealing member 14 is such that this member will easily slip into the end of the pipe. This member is usually formed of soft rubber, or other compressible material, and is adapted to be longitudinally compressible between the members 15 and 16, this longitudinal compression causing a transverse elongation in a manner to cause the sealing member to engage the inner walls of the pipe.

A guide means is formed by a tube 20 threaded for at least a portion of its length, this threaded portion being screwed into an opening in the retaining member 15 in a manner to be concentric with the central axis of the sealing member 14 and the retaining member 15. The tube 20 extends through a neck 21 of the cap member 16 and has a large thumb screw 23 threaded thereon by which the sealing member may be compressed between the members 15 and 16 in a manner to cause a transverse elongation of the sealing member, thus effecting a fluid-tight seal with the walls of the pipe.

This apparatus is old and at present widely used in the art, and I have designed my invention to be applicable to those pipe plugs already in use, as well as to other plugs which may be specially designed to incorporate my invention. The former type will be described without limiting myself thereto.

As will be seen from Fig. 1, my invention comprises a positive clamping means 30 positioned between the cap member 16 and the sealing member 14. This clamping means has a base member 31 having a central opening adapted to slidably pass the tube 20. A groove 32 is formed in the lower face of the base member 31, this groove being similar both in shape and purpose to the grooves 17 in the cap member 16.

The base member 31 is frusto-conical in shape, having upward converging walls 34 in which longitudinal channels 35 of constant depth and constant width are formed, the upper end of these channels terminating at the upper face of the base member 31 and at the groove 32. Sliding in each of these channels is a tongue 37 of a jaw 38 which is so formed that a surface 39 thereof is shaped to conform to the walls 34. Each jaw 38 is thus free to move longitudinally in one channel 35.

The outer face of each jaw is annular in shape as indicated at 40 and is provided with teeth 41 which engage the inner walls of the pipe 10 when the jaw is moved toward the sealing member 14, these teeth having points which simultaneously engage the pipe 10 when the jaw is thus moved. Three jaws 38 and channels 35 are illustrated in Figs. 1 and 2, although different numbers might be used without departing from the spirit of my invention. Three-point contact between the clamping means and the walls of the pipe is, however, desirable due to the centralizing effect of this type of contact.

To resiliently hold these jaws in a disengaged position, shown in full lines in Fig. 1, I provide a spring wire 45 which is bent circular in shape so as to exert an inward pressure on each of the jaws 38 at all times, this spring passing through holes 46 formed through each of the jaws. I have illustrated this hole as being of circular cross section and curved to follow the contour of the wire spring 45, but it should be understood that I am not limited to this construction.

In operating my invention the pipe plug 12 is inserted in the end of the pipe 10 to be sealed off, and the thumb screw 23 is tightened, thus drawing the cap member 16 and the retaining member 15 together. The force thus exerted is directly transmitted to the clamping means 30 by engagement between a collar 46a of the member 16 and ledges 47 extending inward from each jaw. This forces the jaws into a position indicated by dotted lines 48 of Fig. 1, after which any movement of the cap member 16 toward the retaining member 15 will exert an outward force component, tending to increase the engaging force between the jaws and the pipe 10, and a longitudinal force component tending to compress the sealing member 14 and deform it transversely into a position indicated by dotted lines 50, at which time this member comes into sealing engagement with the interior walls of the pipe 10. Thus, by tightening the thumb screw 23, the jaws and sealing member 14 are caused to engage the pipe, the engaging forces exerted against these jaws being proportional to the engaging forces between the sealing member 14 and the pipe.

Thus, the sealing member effectively seals the end of the pipe, while the clamping means 30 takes all the thrust exerted by fluid pressure in the pipe 10. This fluid pressure may be created by introducing fluid through the tube 20, or the end of this tube may be closed by a cap 52 screwed on the end of this tube and the fluid in the pipe introduced at some other point.

By thus placing the interior of the pipe 10 under high pressure, and closing all of the outlets or ends of the pipe by the pipe plugs 12 of my invention, it is possible to find any leaks that might be present therein or in the joints between the pipe sections.

In Fig. 3 I illustrate a modified form of channel 35 which is of T cross section as indicated by the numeral 56 and which is adapted to guide a tongue 57 which is of similar, though slightly smaller, cross section. Such a channel and tongue prevent the jaws 38 from being removed from engagement with the base member 31 unless these jaws are slid out of the top of the channels.

Thus, this form of my invention may be used with or without the spring means 45.

Another modified form of my invention is illustrated in Figs. 4 and 5 wherein are illustrated jaws 60 which are pivoted relative to the base member 31 on pins 61 passing therethrough and held in a web 62 formed on each side of a triangular boss 63. It should be noted that the inner portions of the jaws are formed with a circular contour 64 which is similar to, and contacts with, a fillet 65 joining the boss 63 and the main portion of the base member 31. Thus any thrust on the jaws is not necessarily carried by the pins 61 but is transmitted directly to the base member.

The outer surface of each jaw is of an annular contour corresponding to the inner diameter of the pipe 10 when this outer surface is viewed as indicated in Fig. 5. Teeth are formed on this surface of a shape indicated in Fig. 4 so as to be engageable with the pipe 10 when the jaw is swung outward. As will be noted from Fig. 4, the tips of the teeth lie in an arcuate path which is of increasing radius from the pin 61 throughout the length of this path, although the rate of increase need not be a constant. The shape of this path is so designed that there will be no danger of the jaws being moved clockwise into a position in which the central point of contact between jaw and pipe line in the radial plane passing centrally through the pins 61 when the pipe plug is inserted in a standard size of pipe. Thus there is no danger of the jaws being moved into a dead-center position.

The spring 45 may conveniently be utilized for resiliently retaining the pivoted jaws in disengaged position, this spring passing through holes formed in each of the jaws.

In operating the form of my invention illustrated in Fig. 4, the collar 46ₐ engages the jaws, this engagement pivoting the jaws about the pins 61 due to the fact that the collar is of a diameter which is larger than the circle tangent to the axis of the pins 61. After engagement has taken place between the jaws and the pipe, a further rotation of the thumb screw will proportionally increase this engagement and increase the engagement between the sealing member 14 and the pipe 10. When it is desired to release the plug 12 it is only necessary to unscrew the thumb screw, the jaws being then drawn into disengaged position by the spring 45.

I claim as my invention:

1. In a pipe plug the combination of: a base member; a plurality of jaw pivotally mounted on said base member and movable into engagement with said pipe; a sealing means adjacent said base member; and clamping means for simultaneously moving said jaws and said sealing means into engagement with said pipe.

2. A combination as defined in claim 1 in which said clamping means includes a cap member engaging said jaws at radial distances greater than the radius of the circle tangent to the axes about which said jaws pivot.

3. An article of manufacture adapted to cooperate with a sealing member of a pipe plug to close a pipe, which article comprises: a base member; and a plurality of jaws pivoted to said base member in spaced relationship, said jaws being adapted to move into engagement with said pipe when said sealing member engages said pipe.

4. An article of manufacture adapted to cooperate with a pipe plug to close a pipe, which article comprises: a base member including a boss; a fillet joining said boss and the remaining portion of said base member; and a jaw having an inner portion of circular contour corresponding to the contour of said fillet so as to be journalled thereon.

5. An article of manufacture as defined in claim 4 including a pin secured in said base member and holding said inner portion of said jaw in contact with said fillet.

6. An article of manufacture as defined in claim 4 including a web extending forward from said fillet and also including a pin secured in said base member and extending into said jaw in journalling relationship therewith for holding said inner portion of said jaw in contact with said fillet.

In testimony whereof, I have hereunto set my hand at Los Angeles, California, this 8th day of May, 1928.

DONALD R. HINKSTON.